United States Patent
Kotecha et al.

(10) Patent No.: US 9,832,697 B2
(45) Date of Patent: Nov. 28, 2017

(54) PROVIDING WIRELESS SERVICES USING MULTIPLE CORE NETWORKS

(71) Applicant: Verizon Patent and Licensing Inc., Arlington, VA (US)

(72) Inventors: Lalit R. Kotecha, San Ramon, CA (US); Sudhakar Reddy Patil, Westlake, TX (US); Hossein M. Ahmadi, Parsippany, NJ (US); Phillip A. Ritter, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/089,898

(22) Filed: Apr. 4, 2016

(65) Prior Publication Data

US 2017/0289881 A1    Oct. 5, 2017

(51) Int. Cl.
| | |
|---|---|
| H04W 36/00 | (2009.01) |
| H04W 36/14 | (2009.01) |
| H04W 4/00 | (2009.01) |
| H04W 48/16 | (2009.01) |

(52) U.S. Cl.
CPC .......... *H04W 36/14* (2013.01); *H04W 4/005* (2013.01); *H04W 48/16* (2013.01)

(58) Field of Classification Search
CPC ...... H04W 36/14; H04W 4/005; H04W 48/16
USPC ........................................ 455/436, 437, 442
See application file for complete search history.

(56) References Cited

U.S. PATENT DOCUMENTS

| | | | | |
|---|---|---|---|---|
| 8,854,960 | B2* | 10/2014 | Jain | H04W 28/0215 |
| | | | | 370/230 |
| 9,292,077 | B2* | 3/2016 | Tiedemann | H04W 52/0229 |
| 9,301,083 | B2* | 3/2016 | Jain | H04W 4/005 |
| 9,474,069 | B2* | 10/2016 | Krishnaswamy | H04W 4/06 |
| 9,491,673 | B2* | 11/2016 | Jain | H04W 52/0225 |
| 9,560,140 | B2* | 1/2017 | Giaretta | H04W 4/00 |
| 2011/0010543 | A1* | 1/2011 | Schmidt | H04W 12/10 |
| | | | | 713/168 |
| 2013/0336222 | A1* | 12/2013 | Lu | H04W 72/00 |
| | | | | 370/328 |
| 2014/0269269 | A1* | 9/2014 | Kovvali | H04W 24/08 |
| | | | | 370/229 |
| 2014/0341109 | A1* | 11/2014 | Cartmell | H04L 45/308 |
| | | | | 370/328 |

(Continued)

*Primary Examiner* — Marceau Milord

(57) ABSTRACT

Techniques described herein may enable a wireless telecommunications network to implement different types of core networks, and enable end devices—user equipment (UEs) such as broadband devices (e.g., smartphones, tablets) and Internet of Things (IoT)/Machine Type Communication (MTC) devices (sometimes referred to herein as Machine-to-Machine (M2M) devices)—to connect to whichever core network is most suitable to the capabilities of the UE. For example, a broadband core network may provide UEs with broadband connectivity for media sessions (e.g., telephone calls, video calls, etc.) and broadband Internet access. An M2M core network may provide UEs with network connectivity consistent with the lower resource usage patterns typical M2M devices. Additionally, a UE connected to a first core network (e.g., an M2M core network) may detect a prompt to connect to a second core network (e.g., a broadband core network), and in response, may dynamically switch to the second core network.

20 Claims, 9 Drawing Sheets

(56) References Cited

U.S. PATENT DOCUMENTS

| | | | | |
|---|---|---|---|---|
| 2015/0215832 A1* | 7/2015 | Fitzpatrick | ............ | H04W 48/18 455/426.1 |
| 2016/0044529 A1* | 2/2016 | Pinheiro | ............ | H04W 76/023 370/237 |
| 2017/0078828 A1* | 3/2017 | Watfa | ............ | H04W 4/005 |

* cited by examiner

Network Access Policy for UEs

| UE Type | PLMN ID A | PLMN ID B | DESCRIPTION |
|---|---|---|---|
| Device Type 1 | IMS APN INTERNET APN | (N/A) | Broadband device with media session and broadband Internet capabilities (e.g., a smartphone, a tablet computer, etc.) |
| Device Type 2 | (N/A) | M2M APN | Standard M2M device (unable to establish media sessions or access the Internet) |
| Device Type 3 | IMS APN | M2M APN | M2M device with media session capabilities that may be used on occasion (e.g., for emergencies) |
| Device Type 4 | INTERNET APN | M2M APN | M2M device with broadband Internet capabilities that may be used on occasion (e.g., to obtain additional information requested by a user) |
| ... | ... | ... | ... |

Fig. 5

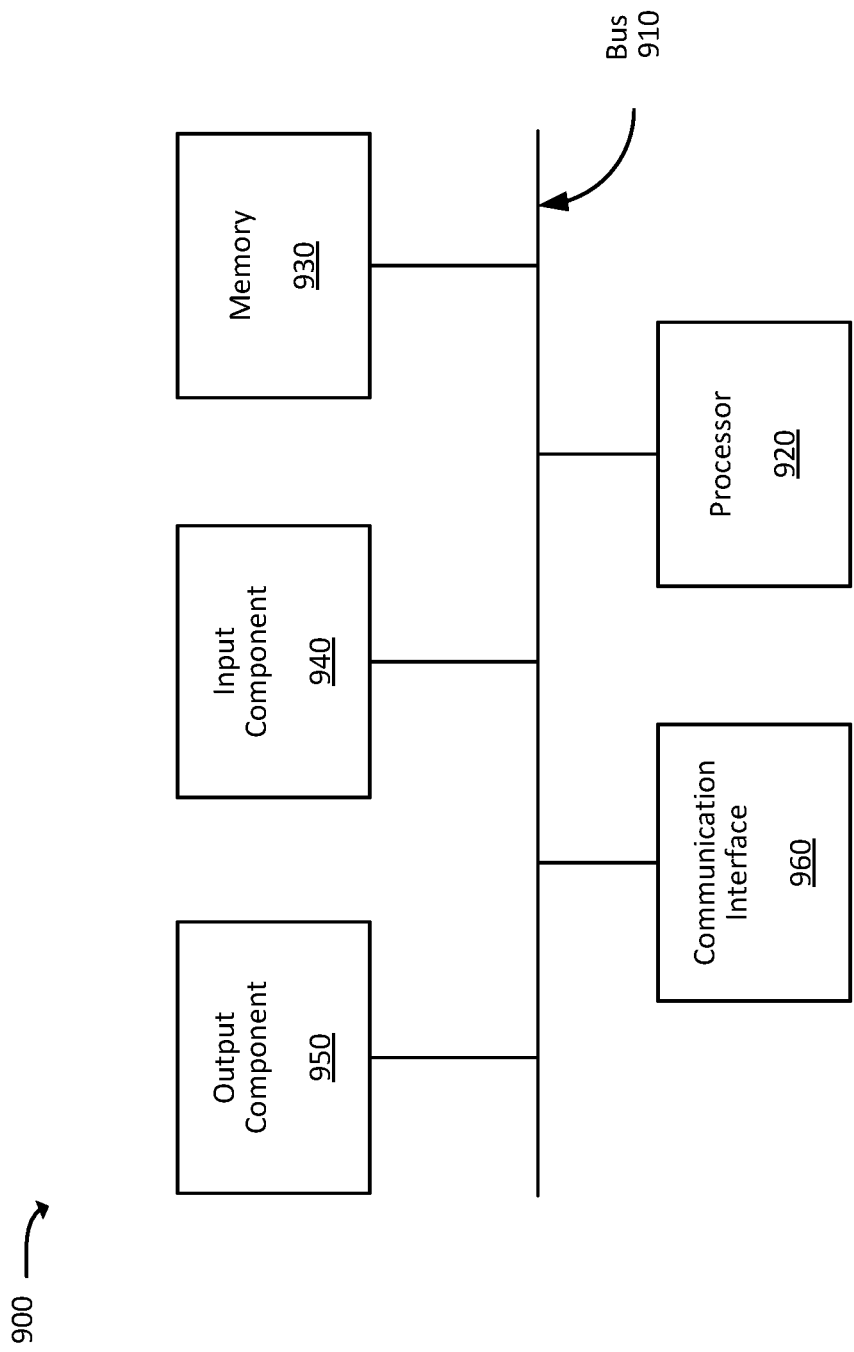

PROVIDING WIRELESS SERVICES USING MULTIPLE CORE NETWORKS

BACKGROUND

Wireless telecommunication networks often include end nodes (user equipment (UEs)) that connect to a core network via radio access networks (RANs). An example of a wireless telecommunications network may include an Evolved Packet System (EPS) with a Long Term Evolution (LTE) network and an evolved packet core (EPC) network, which operates based on the 3rd Generation Partnership Project (3GPP) wireless communication standard. The LTE network may include a RAN that include one or more base stations, some or all of which may take the form of enhanced Node Bs (eNBs), through which the end nodes may communicate with the EPC network.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 5 is a diagram representing an example network access policy;

FIG. 9 is a block diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein may enable a wireless telecommunications network to implement different types of core networks, and enable end devices—user equipment (UEs) such as broadband devices (e.g., smartphones, tablets) and Internet of Things (IoT)/Machine Type Communication (MTC) devices (sometimes referred to herein as Machine-to-Machine (M2M) devices)—to connect to whichever core network is most suitable to the capabilities of the UE. For example, the wireless telecommunications network may have a first core network (also referred to herein as a "broadband core network") that provides network services primarily to broadband devices, and a second core network (also referred to herein as an "M2M core network") that provides network services primarily to M2M devices. Since broadband devices may have resource-intensive usage patterns—for example, usage of data-intensive applications such as audio/video exchange, web browsing, etc.—as well as the need for specialized network services such as an IP Multimedia Subsystem (IMS) to establish media sessions (e.g., telephone calls, video calls, other audio and/or video data exchanges), the first core network may be costly to implement and maintain, particularly at the scale necessary to accommodate the quantity and usage of broadband devices.

By contrast, the second core network for usage by M2M devices may be implemented using fewer resources, with network elements and policies commensurate to supporting the lower resource usage patterns of M2M devices (e.g., lower data exchange rates (and lower overall data quantities), no audio/video capabilities, limited mobility, limited external network access, etc.). As such, a wireless telecommunications network implementing the techniques described herein may be specialized according to the needs of the UEs in the network, thereby achieving more efficient utilization of network resources. Additionally, a UE may be capable of switching from one core network to another core network in certain circumstances. For instance, a UE that typically operates as an M2M device, but is capable of conducting media sessions (e.g., making emergency telephone calls, video calls or other types of video feeds (e.g., security cameras), etc.), may switch from the M2M core network to the broadband core network in order to conduct the media session.

Figure 1:
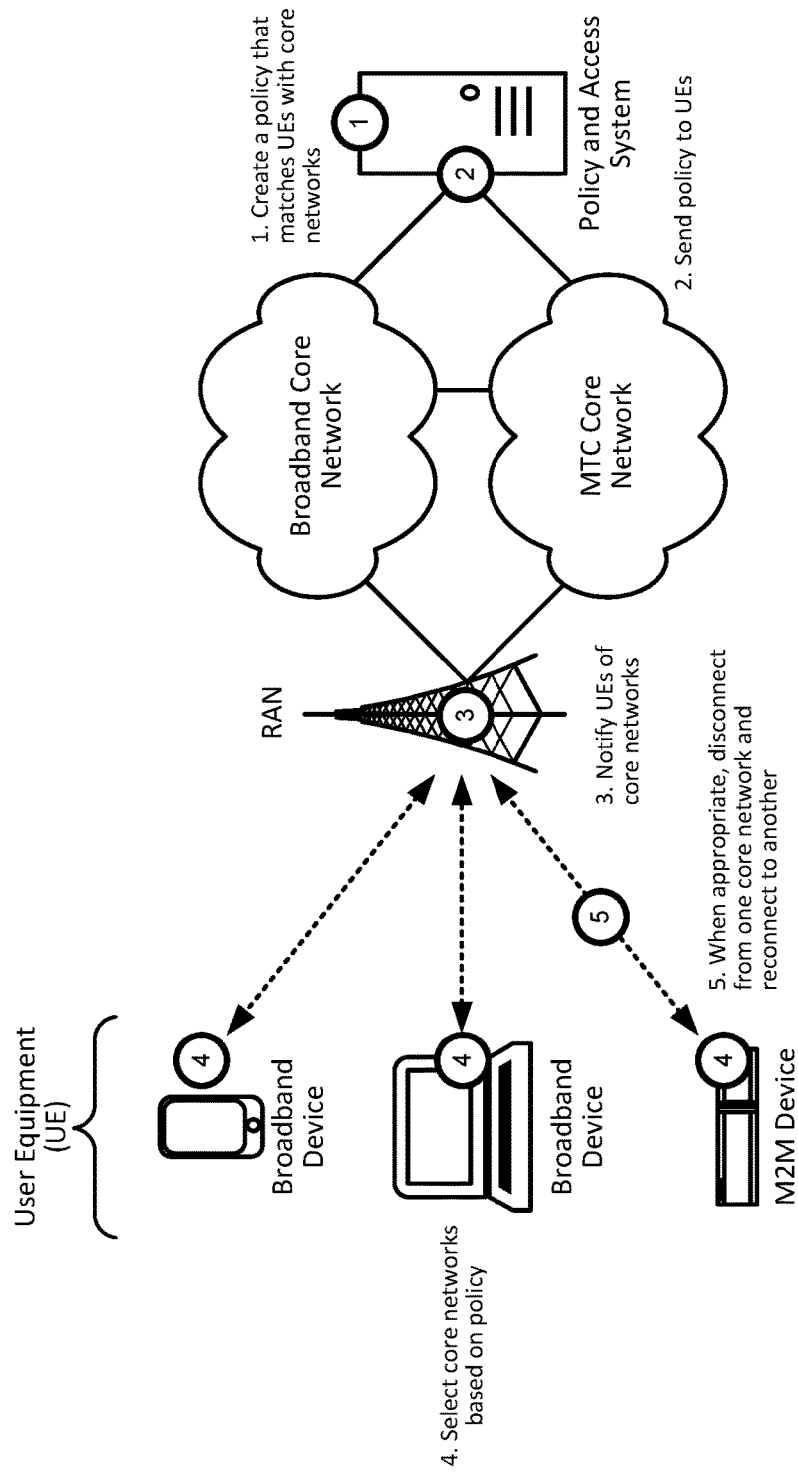
FIG. 1 illustrates an example overview of an implementation described herein.

FIG. 1 illustrates an example overview of an implementation described herein. As shown, a policy and access system may create a network access policy that matches certain UEs with certain core networks of a wireless telecommunications network (at 1). The policy may include rules and instructions for UEs capable of establishing media session (e.g., telephone calls, video calls, other audio and/or video data exchanges) and accessing the Internet (e.g., smartphones, tablet computers, etc.) to connect to a broadband core network. The policy may also include rules and instructions for M2M devices to connect to an M2M core network in order to access the Internet. An M2M device may include a device that collects certain types of information and periodically sends the information to a destination device (e.g., a remote server) via the wireless telecommunications network. Examples of an M2M device may include a device within an automated teller machine (ATM) that tracks and reports an amount of currency in the ATM, a device installed in a vehicle that monitors and reports a velocity, an acceleration, a temperature, or other conditions corresponding to the vehicle, and a device connected to a utility meter for measuring and reporting an amount of gas, electricity, etc., that is used.

In some implementations, the network access policy may also include rules for certain UEs to connect with one core network under certain conditions and then another core network under other conditions. For instance, an M2M device that is primarily designed to collect climate information (e.g., temperature, humidity, precipitation, etc.) and send the information to a centralized server. However, the M2M device may be located along a hiking trail, or in another public area, and may be capable of providing maps, directions, and other geographical information to hikers or other passersby.

As such, the network access policy may include rules and instructions for the M2M device to connect to the M2M core network so long as a user does not try to use the M2M device to access geographic information. However, if and when the M2M is used to access the geographic information, the policy may include instructions for the M2M device to disconnect form the M2M core network, connect to the broadband core network, and access Internet services provided by the broadband core network. Once the user is done with the M2M device, the network access policy may include instructions for the M2M device to disconnect from the broadband core network, reconnect to the M2M core network, and resume collecting climate information.

As shown, the policy and access system may send the policy to the UEs of the wireless telecommunications network (at 2). A Radio Access Network (RAN) of the wireless telecommunications network may broadcast the policy to the UEs using system broadcast messages (at 3). Doing so may, for example, enable the UEs to connect to the appropriate core network when initially connecting to the wireless telecommunications network (at 4). At some point, a UE may switch form one core network to another core network in response to a particular prompt or trigger (at 5). For instance, an M2M device that is capable of making emergency telephone calls may initially connect to the M2M core network. However, when a user activates a calling functionality of the M2M device, the M2M device may disconnect from the M2M core network, connect to the broadband core network, and access the calling functionalities of the broadband core network.

Figure 2:
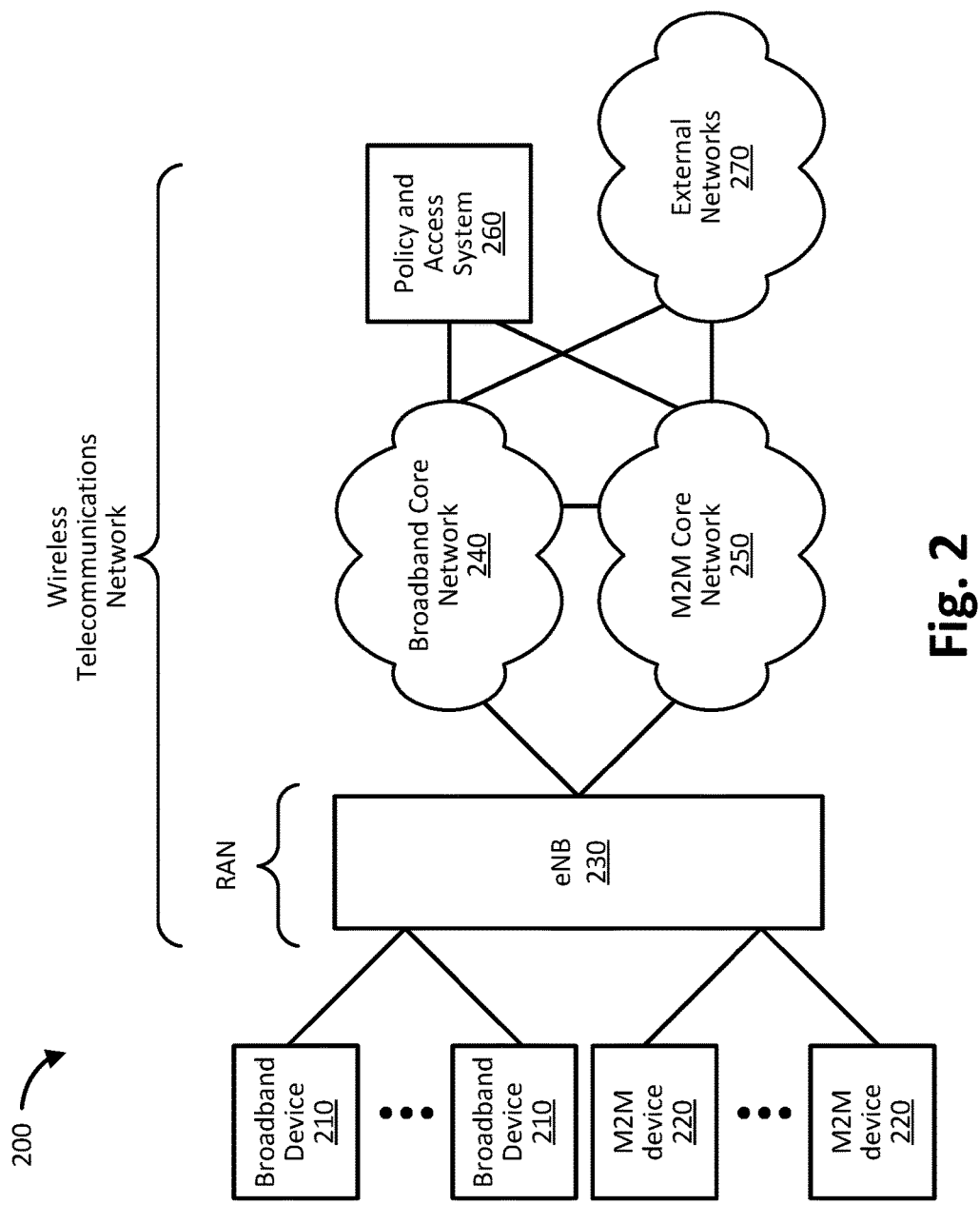
FIG. 2 is a diagram of an example environment in which systems and/or methods described herein may be implemented.

FIG. 2 is a diagram of an example environment 200 in which systems and/or methods described herein may be implemented. Environment 200 may include broadband devices 210, M2M devices 200, a wireless telecommunications network, and external networks. The wireless telecommunications network may include a Long-Term Evolution (LTE) network implemented as broadband core network 240, M2M core network 250, and policy and access system 260. The LTE network may include a RAN consisting of one or more base stations, some or all of which may take the form of enhanced node Bs (eNBs) 230, via which broadband devices 210 and M2M devices 220 may communicate with broadband core network 240 and/or M2M core network 250.

Broadband device 210 may include a portable computing and communication device, such as a personal digital assistant (PDA), a smart phone, a cellular phone, a laptop computer with connectivity to the wireless telecommunications network, a tablet computer, etc. Broadband device 210 may also include a non-portable computing device, such as a desktop computer, a consumer or business appliance, or another device that has the ability to connect to a RAN of the wireless telecommunications network. Broadband device 210 may also include a computing and communication device that may be worn by a user (also referred to as wearable devices) such as a watch, a fitness band, a necklace, glasses, an eyeglass, a ring, a belt, a headset, or another type of wearable device.

Broadband device 210 may be capable of receiving a network access policy from policy and access system 260 and connect to the wireless telecommunications network in accordance with the network access policy. For instance, broadband device 210 may receive broadcast system messages from eNB 230 that provide broadband device 210 with identifiers corresponding to each core network (e.g., broadband core network 240 and M2M core network 250) in the wireless telecommunications network. In response, broadband device 210 may consult the network access policy to identify which of the core networks is most appropriate for broadband device 210. For instance, since broadband core network 240 may be the only core network that supports call and Internet services, the policy may indicate that broadband device 210 is to connect to broadband core network 240.

M2M device 220 may include may include a wireless computing and communication device that may be designed to collect certain types of information and send the information to a destination device (e.g., a server) via the wireless telecommunications network. As mentioned above, examples of M2M device 220 may include a device within an ATM that tracks and reports an amount of cash in the ATM, a device within a vehicle that monitors and reports a velocity, an acceleration, a temperature, or other conditions within the vehicle, and a device connected to a utilities meter for measuring and reporting utility usage information. Relative to broadband device 210, the amount of information sent by M2M device 220 to the wireless telecommunications network may be small. Additionally, the information may be somewhat narrow in scope (e.g., the temperature readings inside an engine of a vehicle) and/or may not be provided in a complex or cumbersome format (e.g., multimedia information). M2M device 240 may, however, be similar to broadband device 210 regarding some of the techniques described herein. For instance, M2M device 220 may receive and implement a network access policy of the wireless telecommunications network.

eNB 230 may include one or more network devices that receives, processes, and/or transmits traffic destined for and/or received from broadband device 210 and/or M2M device 220 via an air interface. eNB 230 may be connected to a network device, such as site router, that functions as an intermediary for information communicated between eNB 230 and broadband core network 240 or M2M core network 250.

Broadband core network 240 may include one or more network devices, some or all of which are similar to network devices provide in a traditional enhanced packet core (EPC) network. Specific examples of the devices of broadband core network 240 are discussed below with reference to FIG. 3. Broadband core network 240 may operate as a core network for certain UEs connected to the wireless telecommunications network. For instance, broadband core network 240 may be capable of providing calling services and Internet access servers to certain UEs, such as broadband devices 210. In some implementations, M2M devices 220 that are capable of making calls and/or accessing the Internet may also connect to broadband core network 240 to make a call and/or access the Internet.

Similarly, M2M core network 250 may include one or more network devices, some or all of which are similar to network devices provide in a traditional EPC network. Examples of the devices of broadband core network 240 are discussed below with reference to FIG. 3. M2M core network 250 may operate as a core network for certain UEs, such as M2M devices 220. For instance, M2M core network 250 may be capable of providing M2M devices with connectivity to servers and/or data repositories to which M2M devices 220 may send information. In some implementations, the servers and/or data repositories to which M2M devices 220 may send information may be part of external network 270 depicted in FIG. 2.

Policy and access system 260 may include one or more computing devices, such as a server device or a collection of server devices, capable of receiving instructions that define a network access policy for the wireless telecommunications network and cause the network access policy to be distributed to UEs. For example, a network administrator may provide rules and instructions to policy and access system 260, which may define how a particular UE should connect to the wireless telecommunications network. Examples of such rules and instructions may include whether the UE should connect to broadband core network 240 or M2M core network 250. In addition, the rules and instructions may indicate when a UE should disconnect from one core network and reconnect to another core network (such as when an M2M device is used to make an emergency call).

External networks 270 may include one or more additional networks, such as a Public Land Mobile Network (PLMN), a Public Switched Telephone Network (PSTN), and/or an Internet Protocol (IP) network (e.g., the Internet). As shown, broadband core network 240 and/or M2M core network 250 may enable a UE to connect to external networks 270. For example, broadband device 210 may access a webpage hosted by an application server via broadband core network 240. Additionally, or alternatively, M2M device 220 may provide information, collected by M2M device 220, to an application server via M2M core network 250.

Figure 3:
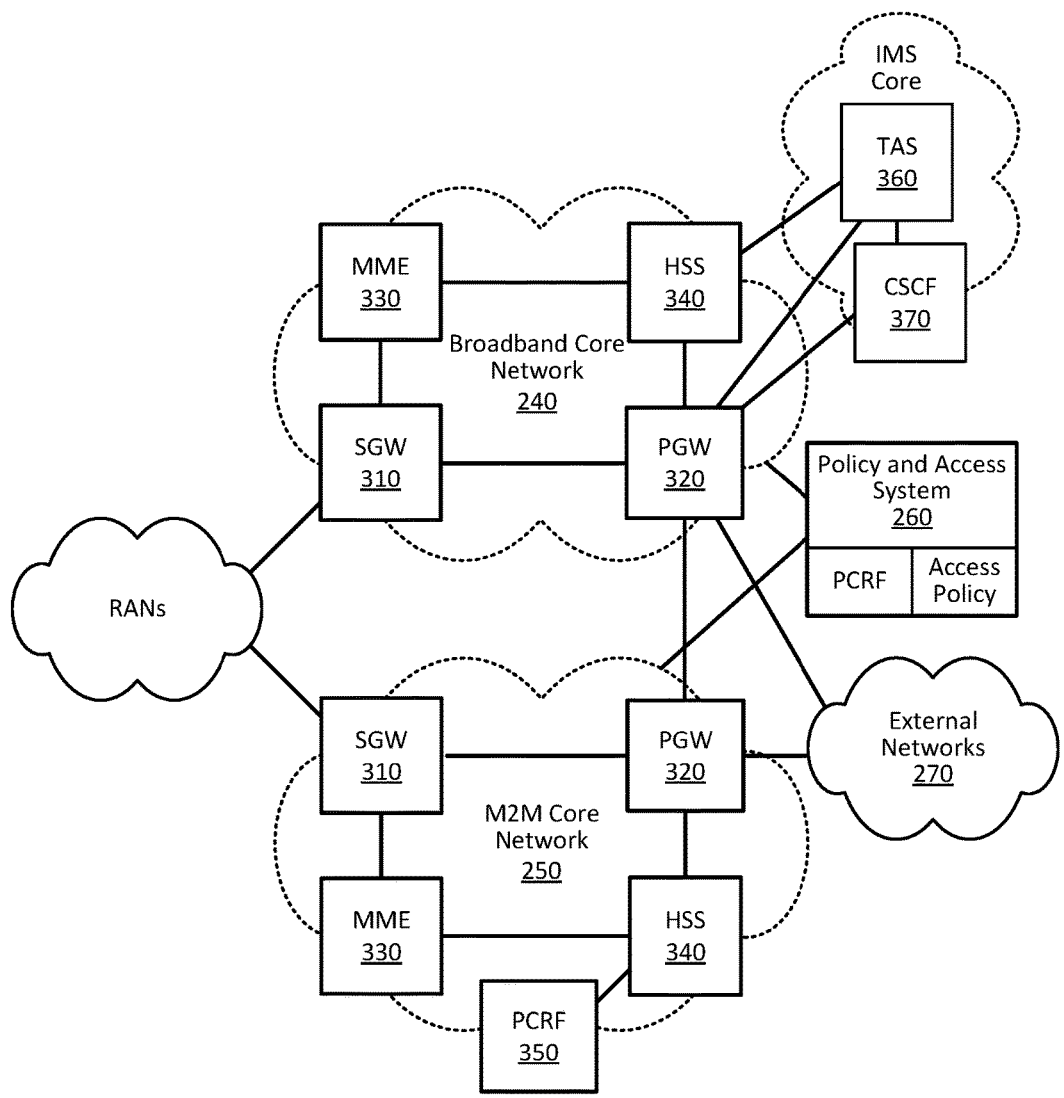
FIG. 3 is a diagram of an example network in which systems and/or methods described herein may be implemented.

FIG. 3 is a diagram of an example network 300 in which systems and/or methods described herein may be implemented. As shown, network 300 may include RANs, broadband core network 240, M2M core network 250, policy and access system 260, and external networks 270, which are generally descried above with reference to FIG. 2. FIG. 3 provides examples of systems and devices that may be used to implement broadband core network 240 and M2M core network 250. As shown, broadband core network 240 and M2M core network 250 may each include a Serving Gateway (SGW) 310, a PDN Gateway (PGW) 320, a Mobility Management Entity (MME) 330, and/or a Home Subscriber Server (HSS) 340. Additionally, broadband core network 240 may include an IP Multimedia Subsystem (IMS) core, which may include a telephony application server (TAS) 360 and a Call Session Control Function (CACF) 370.

SGW 310 may aggregate traffic received from one or more RANs and may send the aggregated traffic to an external network or device via PGW 320. Additionally, SGW 310 may aggregate traffic received from one or more PGWs 320 and may send the aggregated traffic to one or more RANs. SGW 310 may operate as an anchor for the user plane during inter-eNB handovers and as an anchor for mobility between different telecommunication networks. PGW 320 may include one or more network devices that may aggregate traffic received from one or more SGWs 310, and may send the aggregated traffic to an external network. PGW 320 may also, or alternatively, receive traffic from the external network and may send the traffic toward broadband device 210 (via SGW 310 and/or RAN).

MME 330 may include one or more computation and communication devices that act as a control node for RANs and/or other devices that provide the air interface for the wireless telecommunications network. For example, MME 330 may perform operations to register broadband device 210 with the wireless telecommunications network, to establish bearer channels (e.g., traffic flows) associated with a session with broadband device 210 and/or M2M device 220, to hand off broadband device 210 to a different eNB, MME, or another network, and/or to perform other operations. MME 330 may perform policing operations on traffic destined for and/or received from broadband device 210.

HSS 340 may include one or more devices that may manage, update, and/or store, in a memory associated with HSS 340, profile information associated with a subscriber (e.g., a subscriber associated with broadband device 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with broadband device 210. Additionally, or alternatively, HSS 340 may perform authentication, authorization, and/or accounting operations associated with the subscriber and/or a communication session with broadband device 210.

PCRF is depicted in FIG. 3 as being part of the policy and access system 260, which is described above with reference to FIG. 2. As such, it may be possible to implement the PCRF and the network access policies (or "access policies") within the same device (or same group of devices). By contrast, in some implementations, the PCRF may be implemented by one or more other network devices, some or all of which may be independent of policy and access system 260.

Additionally, FIG. 3 depicts a single entity (i.e., policy and access system 260) serving multiple core networks (i.e., broadband core network 240 and M2M core network 250). However, in other implementations, a wireless telecommunications network may include a different arrangement/configuration between core networks 240 and 250 and policy and access system 260. For instance, some implementations may include a different policy and access system 260 for each core network within the wireless telecommunications network. In other example, a wireless telecommunication network may include some core networks that share a single policy and access system 260 while other core networks each have their own policy and access system 260. Accordingly, the arrangement and configuration of the policy and access system 260, the PCRF, the Access Policy, and the core networks that are described herein may be implemented in a wide variety of ways.

The PCRF may receive information regarding policies and/or subscriptions from one or more sources, such as subscriber databases and/or from one or more users. The PCRF may provide these policies to PGW 320 or another device so that the policies can be enforced. As depicted, in some implementations, the PCRF may communicate with PGW 320 to ensure that charging policies are properly applied to locally routed sessions within the telecommunications network. For instance, after a locally routed session is terminated, PGW 320 may collect charging information regarding the session and provide the charging information to the PCRF for enforcement.

TAS 360 may include one or more computation and communication devices that may provide IP call (e.g., VoIP) services. TAS 360 may translate a telephone number into an IP address and/or an IP address into a telephone number in order to establish a call. TAS 360 may also provide call routing and/or call bridge services. TAS 360 may also provide answering services, call forwarding services, and free-call routing services (e.g., for so-called "1-800" numbers). TAS 360 may operate based on a particular communication protocol, such as SIP. In some implementations, TAS 360 may include software, such as a call management application, that enables TAS 360 to perform one or more of the operations described herein, such as determining the connection status of UE 210, determining how to notify UE 210 of an ongoing call based on the connection status of UE 210 (e.g., by using SIP messaging, SMS messaging, etc.), and/or causing calls to be transferred from one UE to another UE.

CSCF 370 may include one or more computation and communication devices that may gather, process, search, store, and/or provide information in a manner described herein. CSCF 370 may process and/or route calls to and from UE 210 via broadband core network 240. For example, CSCF 370 may process calls, received from an external network, that are destined for UE 210. In another example, CSCF 370 may process calls, received from UE 210, that are destined for the external network.

The quantity and arrangement of devices and/or networks, illustrated in FIGS. 2 and 3 are provided for explanatory purposes only. In practice, there may be additional devices and/or networks; fewer devices and/or networks; different devices and/or networks; or differently arranged devices and/or networks than illustrated in FIGS. 2 and 3. For example, broadband core network 240 and/or m2M core network 250 may include some or all of a Public Land Mobile Network (PLMN). Alternatively, or additionally, one or more of the devices illustrated in FIGS. 2 and 3 may perform one or more functions described as being performed by another one or more of the devices illustrated in FIGS. 2 and 3. The illustrated devices may interconnect via wired connections, wireless connections, or a combination of wired and wireless connections.

Figure 4:
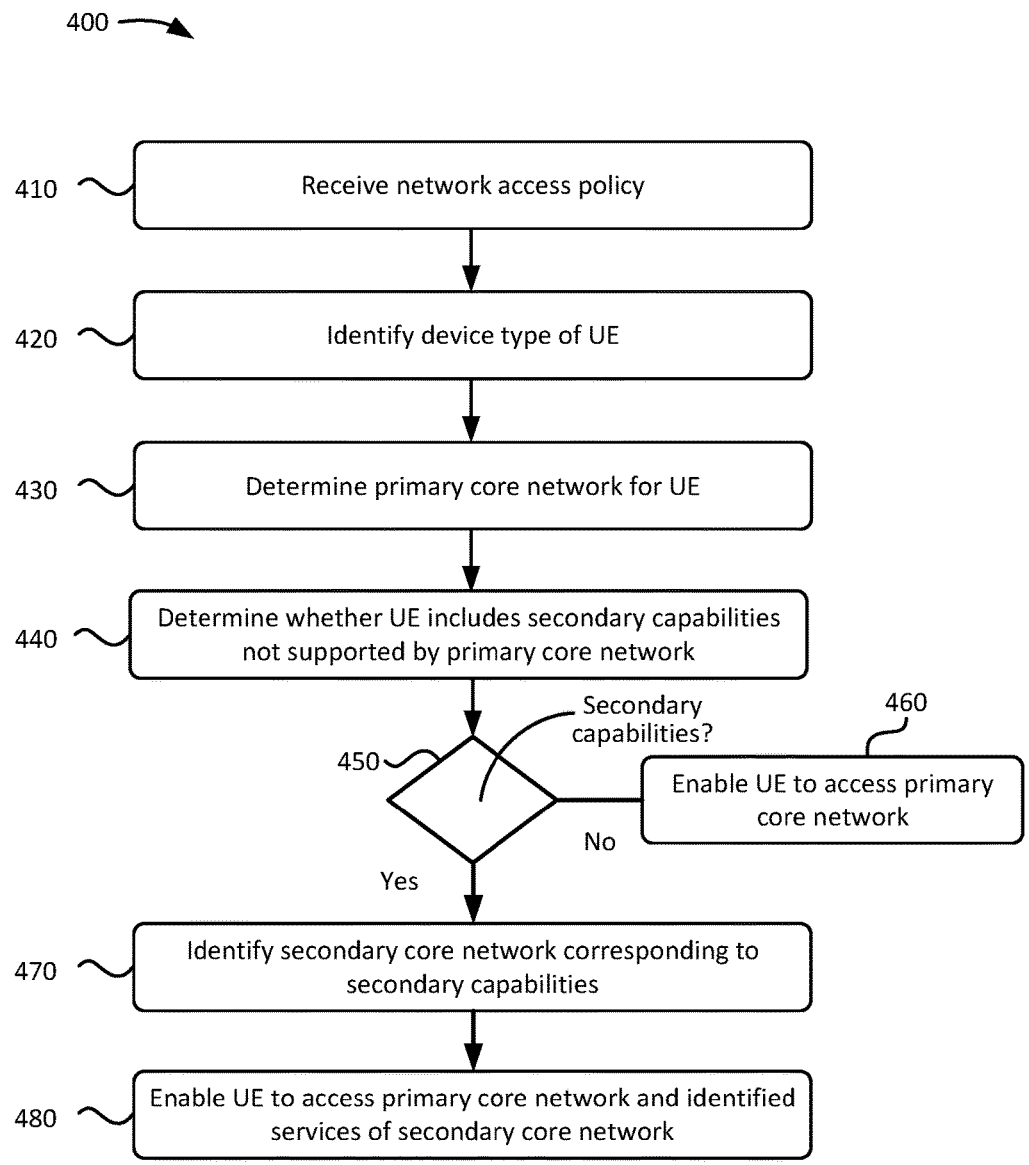
FIG. 4 is a flowchart of an example process for enabling a user equipment (UE) to access an appropriate core network.

FIG. 4 is a flowchart diagram of an example process 400 for enabling a UE to access an appropriate core network. In some implementations, process 400 may be implemented by a UE (e.g., broadband device 210 and/or M2M device 220).

As shown, process 400 may include receiving a network access policy (block 410). For example, a UE may receive rules and instructions from policy and access system 260 about how to connect to a wireless telecommunications network (e.g., whether to connect to broadband core network 240 or M2M core network 250 of the wireless telecommunications network). The UE may implement the rules and instructions while attaching to the wireless telecommunications network. In some implementations, the rules and instructions may enable the UE to perform one or more of the operations described in process 400, such as determining a device type of the UE, determining a primary core network based on the device type, determining whether the UE includes any secondary capabilities, etc.

Process 400 may include identifying a device type of the UE (block 420). For instance, the UE may perform a self-diagnostic operation in order to determine whether the UE is a broadband device or an M2M device. In some implementations, the device type of the UE may be included in device specification information stored by the UE. In some implementations, the UE may determine it's own device type by identifying and characterizing functions performed by the UE. For instance, the UE may be a broadband device if the primary function of the UE includes making establishing media sessions (e.g., telephone calls, video calls, etc.) and accessing the Internet on a regular basis, storing the contact information of other broadband devices, downloading and executing mobile applications, participating in video calling, etc. By contrast, the UE may be an M2M device if the UE the primary functions of the UE includes collecting a preselected type of information and sending the information to a particular destination device, such as a remote server.

Process 400 may include determining a primary core network for the UE (block 430). For example, the UE may determine the type of core network that is most appropriate for the UE, based on the device type and/or primary functions of the UE. If the UE corresponds to a broadband device, the primary core network for the UE may be broadband core network 240. If the UE is an M2M device, the primary core network for the UE may be M2M core network 250. The primary core network may be the core network to which the UE connects by default, most frequently, under typical operating conditions, etc. In some implementations, a UE may determine an appropriate core network by comparing the primary functions of the UE with the services supported by each core network (the services supported by each core network may have been received in the network access policy described above).

Process 400 may include determining whether the UE includes any secondary capabilities that not supported by the primary core network (block 440). For example, a UE may determine whether it has any capabilities corresponding to services to network services (e.g., telephone calls, video calls, etc.) that are not supported by the primary core network. In one example, a UE may determine that it is a M2M device and that the primary core network for the UE is M2M core network 250. However, the UE may have the ability to make telephone calls in emergency situations, which is a capability that is not supported by M2M core network 250. In another example, the UE may only include M2M operations such that all of the capabilities of the M2M device are supported by M2M core network 250. The UE may determine whether it has any secondary capabilities that are not supported by the primary core network by comparing the network-dependent capabilities of the UE with the services supported by the primary core network (which may be found in the network access policy previously received by the UE).

When the UE does not include any secondary capabilities that cannot be satisfied by the primary core network (block 450—No), process 400 may include enabling the UE to access the primary core network (block 460). For example, if the UE is an M2M device that only includes M2M capabilities (e.g., collecting and transmitting information), the UE may enable itself to only connect to M2M core network 250. Similarly, if the UE is a broadband device that includes broadband device capabilities (e.g., calling, accessing the Internet, etc.), the UE may enable itself to only connect to broadband core network 240.

By contrast, when the UE includes secondary capabilities that are not supported by the primary core network (block 450—Yes), process 400 may include identifying a secondary core network corresponding to the secondary capabilities of the UE (block 470). For example, the UE may match one or more of the secondary capabilities of the UE with the services that are supported by a core network other than the primary core network. The services supported by broadband core network 240 and M2M core network may be provided to the UE in the network access policy received from policy and access system 260. In one example, if the UE is an M2M device capable of making emergency telephone calls, the UE may match the telephone call capabilities of the UE with the network services (e.g., call services) supported by broadband core network 240. In another example, if the UE is a broadband device capable of operating as an M2M device (e.g., collecting and transmitting geographic information, usage information, etc.) under certain circumstances (e.g., while in a sleep mode), the UE may match the M2M functionality with M2M core network 250.

Process 400 may include enabling the UE to access the primary core network and the secondary core network (block 480). For example, the UE may enable itself to access the primary network by default and the secondary network in response to a particular condition, event, or prompt. An example of such an event may include an M2M device receiving a notification, from M2M core network 250, of an incoming call. In another example the prompt may include the UE entering a sleep mode or another type of reduced level of activity. As described below in greater detail, the UE may be enabled to access broadband core network 240 and/or M2M core network 250 based on information in the network access policy.

In some implementations, the UE may only be enabled to access a particular network service of the secondary core network. For instance, an M2M device 220 capable of establishing a media session (e.g., a telephone call, video call, etc.) may be enabled to access broadband core network 240 in order to establish the media session; however, M2M device 220 may not be able to access any of the other network services (e.g., Internet access with higher data rates than the Internet access supported by M2M core network 250) supported by broadband core network.

FIG. 5 is a diagram representing an example network access policy. As shown, the example network access policy represented in FIG. 5 includes a column of UE types, columns indicating which UE types corresponds to PLMN ID A and PLMN ID B, and a description corresponding to each UE type. A PLMN ID A may correspond to broadband core network 240 and PLMN ID B may correspond to M2M core network 250.

UEs that correspond to device type 1 may include typical broadband devices 210 (e.g., UEs that are often involved in telephone calls, video calls, browsing the Internet, executing mobile applications, communicating with multiple, distinct application servers, etc.). As such, UEs that correspond to device type 1 may use an IMS access point name (APN) for accessing the calling service supported by broadband core network 240. Similarly, UEs that correspond to device type 1 may use an Internet APN for accessing an Internet access service supported by broadband core network 240. By contrast, UEs that correspond to device type 2 may include M2M devices 220 that are capable of M2M operations, such as collecting certain types of information and sending the information to a remote server or another type of data repository. UEs that correspond to device type 2 may use an M2M APN for connecting to M2M core network 250.

UEs that correspond to device type 3 may include a UE that primarily functions as a standard M2M device, but on occasion may be used to establish a media session (e.g., a telephone call, a video call, etc.). As such, UEs that correspond to device type 3 may use an M2M APN to connect to M2M core network 250 under typically operating conditions, but may use the IMS APN to establish a media session (e.g., via the IMS core of broadband core network 240). UEs that correspond to device type 4 may include M2M devices 220 that primarily engage in M2M activities, but that on occasion may be used to browse the Internet, access an application server, download information from the Internet (e.g., to provide a map or directions to hikers), etc. As such, UEs that correspond to device type 4 may use an M2M APN to connect to M2M core network 250 while operating as a typical M2M device, but may use the Internet APN of to access the Internet via broadband core network 240.

Figure 6:
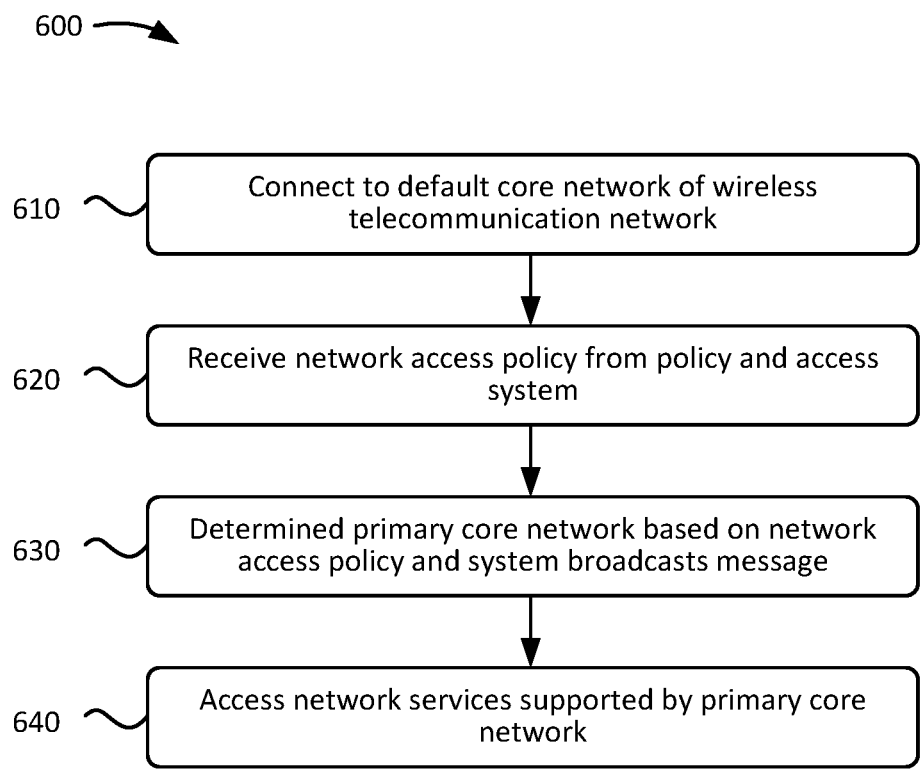
FIG. 6 is a flowchart of an example process for accessing a primary core network.

FIG. 6 is a flowchart of an example process 600 for accessing a primary core network. Process 600 may be implemented by a UE (e.g., broadband device 210 and/or M2M device 220).

As shown, process 600 may include connecting to a default core network of a wireless telecommunications network (block 610). For example, broadband core network 240 or M2M core network may be designated as a default core network for the wireless telecommunications network. As such, when a UE initially connects to the wireless telecommunications network (e.g., before the UE has received a network access policy for the wireless telecommunications network), the UE may automatically connect to whichever core network (e.g., broadband core network 240 or M2M core network) is designated as the default core network, regardless of whether the UE is broadband device 210 (e.g., a smartphone, a tablet computer, etc.) or M2M device 220.

Process 600 may include receiving a network access policy from policy and access system 260 (block 620). For example, at some point after the UE has connected (e.g., attached) to the default core network, the UE may receive a network access policy from policy and access system 260. As mentioned above, the network access policy may include rules and instructions for identifying, and connecting to, an appropriate core network (e.g., core network 240 or M2M core network 250) of the wireless telecommunications network. The network access policy may include information that enables the UE to identify available PLMNs and network services that correspond to each of the PLMNs. For instance, the network access policy may include an identifier of a PLMN (a PLMN ID) designed to support media sessions (e.g., telephone calls, video calls, other types of audio and/or video data exchanges, etc.) and/or broadband Internet access. The network access policy may also include an identifier of a PLMN (a PLMN ID) designed to support lower resource usage patterns of M2M devices (e.g., lower data exchange rates (and lower overall data quantities), no audio/video capabilities, limited mobility, limited external network access, etc.). The network access policy may also include APN information for the services supported by each PLMN. For example, the network access policy may include an IMS APN for media sessions (e.g., telephone calls, video calls, etc.), an Internet APN for broadband Internet access, and an APN for Internet access consistent with M2M network usage patterns.

Process 600 may include determining a primary core network based on the system broadcast message and the network access policy (block 630). For example, the UE may identify which of the core networks of the wireless telecommunications network are most suitable to providing network services that correspond to the capabilities of the UE. In other words, the UE may determine that the primary core network is whichever core network (broadband core network 240 or M2M core network 250) is the most suitable or appropriate for the UE. Additionally, as describe above with reference to FIG. 5, each core network may be associated with an identifier (e.g., PLMN ID A or PLMN ID B). As such, the UE may identify the primary core network comparing the capabilities of the UE to the network services (and PLMN IDs) described by the network access policy.

Process 600 may include accessing network services supported by the primary core network (block 640). For example, the UE may determine whether the default network (to which the UE is already connected) corresponds to the primary core network of the UE. If the default network is the primary core network for the UE, the UE may remain connected to the default core network and may access network services supported by the default core network based on APNs (e.g., a APN for IMS services, an APN for broadband Internet access, or an APN for M2M devices) provided in the network access policy.

By contrast, if the default network (to which the UE is connected) does not correspond to the primary core network for the UE, the UE may disconnect from the default network and connect to the primary core network. The UE may connect to the primary core network by performing an Attach procedure (e.g., an Attach Request, an Authentication Request, an Authentication Response, etc.) that is consistent with the 3GPP Communication Standard. Additionally, the UE may access network services supported by the primary core network based on APNs provided in the network access policy (e.g., an APN for IMS services, an APN for broadband Internet access, or an APN for M2M devices).

Figure 7:
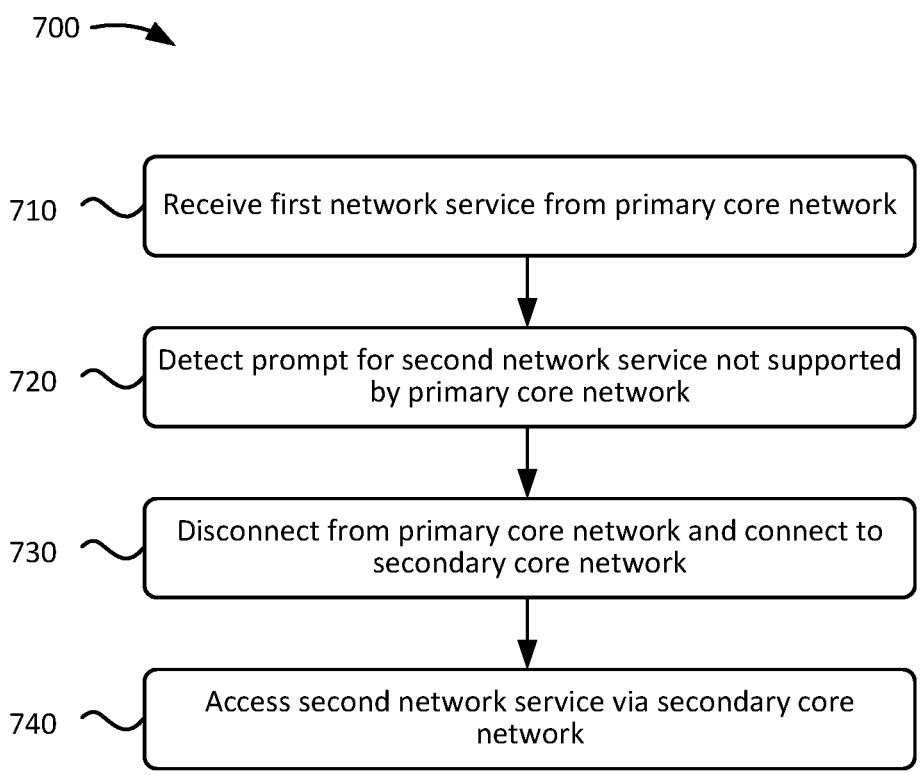
FIG. 7 is a flowchart of an example process for switching from one core network to another core network.

FIG. 7 is a flowchart diagram of an example process 700 for switching from one core network to another core network. Process 700 may be implemented by a UE (e.g., broadband device 210 and/or M2M device 220). In some implementations, the primary core network may be an example of M2M core network 250, and the secondary core network may be an example of broadband core network 240. In other implementations, the primary core network may be an example of broadband core network 240, and the secondary core network may be an example of M2M core network 250.

As shown, process 700 may include receiving a first network service from a primary core network (block 710). For example, M2M device 220 may be connected to M2M core network 250 that M2M device 220 may use to communicate with external network 270 (e.g., the Internet). In another example, broadband device 210 may connect to broadband core network 240 to gain access to a network service supported by broadband core network 240 (e.g., a calling service an Internet access service, etc.).

Process 700 may also include detecting a prompt for a second network service that is not supported by the primary core network (block 720). For example, while M2M device 220 is connected to M2M core network 250, M2M device 220 may receive a request, from a user, for M2M device 220 to establish a media session (e.g., telephone calls, video calls, other types of audio and/or video data exchanges, etc.). M2M device 220 may receive the request via the user pressing a button, a touchable screen object, or another type of user interface device/object of M2M device 220. In some implementations, the prompt may include another type of event that informs M2M device 220 to switching from M2M core network 250 to broadband core network 240. In some implementations, M2M device 220 may have to determine that M2M core network 250 does not support a network service (e.g., a media session, broadband Internet access, etc.) corresponding to the request or prompt, that broadband core network 240 does support the network service, and/or that M2M device 220 should connect to broadband core network 240 in order to access the network service.

In another example, broadband device 210 may enter into a sleep mode or another type of low utilization mode, which broadband device 210 may detect as a prompt for an Internet access service with a limited data rate suitable for M2M devices 220 (as opposed to an Internet access service with a data rate that is more suitable for broadband device 210). Additionally, broadband device 210 may determine that the primary core network (e.g., broadband core network 240) of the broadband device 210 does not support the network service to which the prompt corresponds and/or that broadband device 210 should connect to M2M core network 250.

Process 700 may include disconnecting from the primary core network and connecting to the secondary core network (block 730). For example, in response to the prompt discussed above with reference to block 720, M2M device 220 may disconnect from M2M core network 250 and connect to broadband core network 240. Similarly, broadband device 210 may respond to the prompt by disconnecting from broadband core network 240 and connecting to M2M core network 250. In some implementations, connecting to the second core network may include the UE (e.g., broadband device 210 or M2M device 220) referencing an appropriate identifier of the second core network, provided in the network access policy (e.g., PLMN ID A or PLMN ID B of FIG. 5). In order to connect to the secondary core network, M2M device 220 may perform a new Attach procedure with respect to the secondary core network (e.g., Attach Request, Authentication Response, Attach Complete, etc.).

Process 700 may include accessing the second network service via the secondary core network (block 740). For example, depending on whether the second network service corresponds to establishing media sessions (e.g., telephone calls, video calls, other audio and/or video data exchanges), accessing the Internet, or another network service supported by broadband core network 240, M2M device 220 may use an appropriate APN of broadband core network 240 to access the second network service (e.g., IMS APN, Internet APN, etc.). Similarly, broadband device 210 may access the second network service by using an appropriate APN of M2M core network 250 (e.g., M2M APN). In some implementations, the UE may use information provided in the network access policy to access the second network service via the secondary core network.

Figure 8:
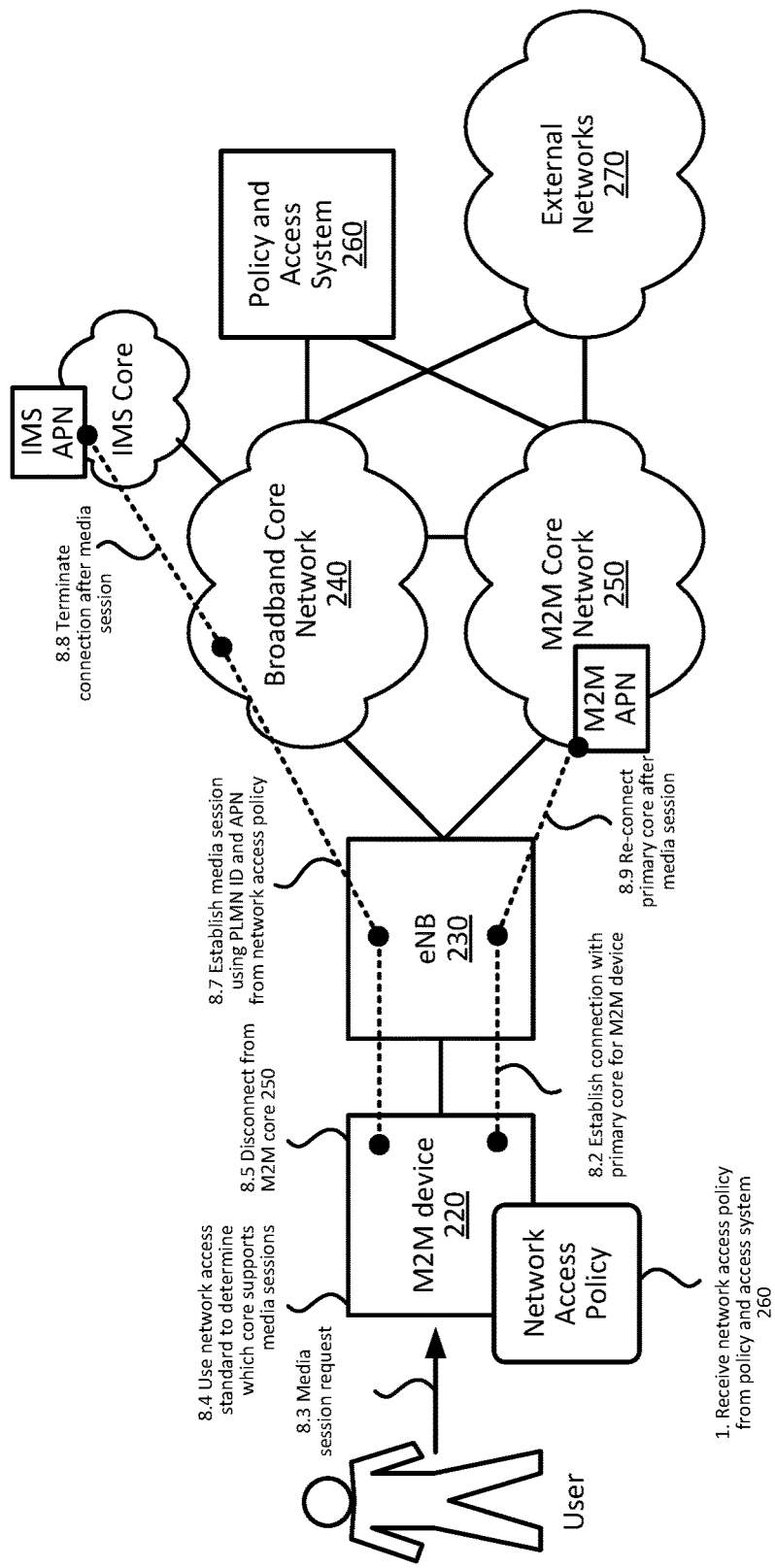
FIG. 8 is a diagram of an example of a UE switching from one core network to another core network.

FIG. 8 is a diagram of an example of a UE switching from M2M core network 250 to broadband core network 240 in order to establish a media session. In the example of FIG. 8, assume that M2M device 220 has already received the network access policy (described above with reference to FIG. 5) from policy and access system 260 (at 1), and that M2M device 220 has determined that the primary core network for M2M device 220 is M2M core network. As such, based on the network access policy, M2M device 220 may establish a connection with M2M core network 250 (at 8.2) since, for example, M2M core network 250 may be more suitable for M2M device 220.

At some point, M2M device 220 may receive a prompt, detect a trigger, or experience another type of pre-defined event that includes a request for M2M device 220 to establish a media session with another device (e.g., a telephone call, a video calls or other audio and/or video data exchange) (at 8.3). In response to the prompt, M2M device 220 may determine, based on the network access policy, that broadband core network 240 supports media sessions (at 8.4). Additionally, M2M device may determine, based on the information in the network access policy, that M2M device 220 may establish the media session by communicating with an IMS of the IMS core. As such, M2M device 220 may disconnect from M2M core network 250 (at 8.5), and connect to broadband core network 240 using a PLMN identifier (ID) associated with broadband core network 240 in the network access policy. M2M device 220 may establish the media session by communicating with the IMS core, of broadband core network 240, based on an IMS APN from the network access policy (at 8.7). At some point, the media session may end, and in response, M2M device 220 may terminate the media session (at 8.8) and reconnect to the primary core network for M2M device 220 (i.e., M2M core network 250) (at 8.9).

FIG. 9 is a diagram of example components of a device 900. Each of the devices illustrated in FIGS. 1, 2, 3, and 8 may include one or more devices 900. Device 900 may include bus 910, processor 920, memory 930, input component 940, output component 950, and communication interface 960. In another implementation, device 900 may include additional, fewer, different, or differently arranged components. As described herein, a component may be implemented by hardware circuitry, software logic, and/or some combination thereof.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 4, 6, and 7 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A user equipment (UE) comprising:
a non-transitory memory device storing processor-executable instructions; and
one or more processors configured to execute the processor-executable instructions, wherein executing the processor-executable instructions causes the one or more processors to:

when initially connecting to a wireless telecommunications network that includes a first core network and a second core network,
connect, by default, to the first core network, the first core network operating as a default core network, of the wireless telecommunications network, for distributing a network access policy;
receive, from a policy and access system connected to the first core network, the network access policy, the network access policy including:
information identifying the first core network of the wireless telecommunications network;
information identifying the second core network of the wireless telecommunications network;
information identifying an Access Point Name (APN) for accessing a first network service of the first core network;
information identifying an APN for accessing a second network service, which is different from the first network service, of the second core network; and
instructions to switch between the first core network and the second network in order to access the first network service and the second network service depending on a request from a user to access the second network service;
access the first network service, of the first core network, using the APN of the first network service;
detect, as a prompt, the request from the user to access the second network service; and
in response to the prompt, use the information and instructions of the network access policy to:
disconnect from the first core network;
connect to the second core network; and
access the second network service via the second core network.

2. The UE of claim 1, wherein:
the first network service includes providing network connectivity that is consistent with lower network resource usage patterns of Machine-to-Machine (M2M) devices, and
the second network service includes enabling UEs to establish media sessions and providing UEs with broadband Internet connectivity.

3. The UE of claim 1, wherein executing the processor-executable instructions causes the one or more processors to:
prior to accessing the first network service,
determine, based on the network access policy, whether the first core network or the second core network corresponds to a primary core network for the UE,
when the first core network corresponds to the primary core network for the UE,
remain connected to the first core network, and
when the first core network does not correspond to the primary core network for the UE,
disconnect from the first core network, and
connect to the second core network for the UE.

4. The UE of claim 3, wherein:
the network access policy also includes information describing the first network service and the second network service, and
executing the processor-executable instructions causes the one or more processors to:
determine whether the first core network or the second core network corresponds to the primary core network by determining whether the first network service or the second network service is more suitable to a primary functionality of the UE.

5. The UE of claim 1, wherein:
the first network service, of the first core network, includes providing UEs with network connectivity that is consistent with lower network resource usage patterns of typical Machine-to-Machine (M2M) devices,
the second network service, of the second core network, includes providing UEs with broadband network connectivity capable of supporting media sessions between UEs, and
executing the processor-executable instructions causes the one or more processors to:
under typical operating conditions,
connect to the first core network, and
operate in a manner consistent with that of a M2M device; and
in response to the prompt,
connect to the second core network, and
establish a media session via an Internet Protocol (IP) Multimedia Subsystem (IMS) of the second core network.

6. The UE of claim 5, wherein executing the processor-executable instructions causes the one or more processors to:
in response to a termination of the media session:
disconnect from the second core network, and
reconnect with the first core network, and
resume operating as the M2M device.

7. The UE of claim 5, wherein the second core network also provides a third network service capable of providing broadband Internet access.

8. The UE of claim 1, wherein:
the UE includes a broadband device, and
executing the processor-executable instructions causes the one or more processors to:
establish a media session via an Internet Protocol (IP) Multimedia Subsystem (IMS) of the first core network, or
obtain broadband Internet access via the first core network, and
in response to the prompt,
connect to the second core network, and
operate in a manner that is consistent with lower network resource usage patterns of M2M devices.

9. The UE of claim 1, wherein the prompt includes a request to make an emergency call via the wireless telecommunication network.

10. A non-transitory computer-readable medium to cause one or more processors to execute processor-executable instructions, wherein the processor-executable instructions cause the one or more processors to:
when initially connecting to a wireless telecommunications network that includes a first core network and a second core network,
connect, by default, to the first core network, the first core network operating as a default core network, of the wireless telecommunications network, for distributing a network access policy;
receive, from a policy and access system connected to the first core network, the network access policy, the network access policy including:
information identifying the first core network of the wireless telecommunications network;
information identifying the second core network of the wireless telecommunications network;

information identifying an Access Point Name (APN) for accessing a first network service of the first core network;
information identifying an APN for accessing a second network service, which is different from the first network service, of the second core network; and
instructions to switch between the first core network and the second network in order to access the first network service and the second network service depending on a request from a user to access the second network service;

access the first network service, of the first core network, using the APN of the first network service detect, as a prompt, the request from the user to access the second network service;

in response to the prompt, use the information and instructions of the network access policy to:
disconnect from the first core network;
connect to the second core network; and
access the second network service via the second core network.

11. The non-transitory computer-readable medium of claim 10, wherein:
the first network service includes providing network connectivity that is consistent with lower network resource usage patterns of Machine-to-Machine (M2M) devices, and
the second network service includes providing UEs with network connectivity capable of supporting media sessions between UEs and providing UEs with broadband Internet connectivity.

12. The non-transitory computer-readable medium of claim 10,
the processor-executable instructions cause the one or more processors to:
prior to accessing the first network service,
determine, based on the network access policy, whether the first core network or the second core network corresponds to a primary core network for the UE,
when the first core network correspond to the primary core network for the UE,
remain connected to the first core network, and
when the first core network does not correspond to the primary core network for the UE,
disconnect from the first core network, and
connect to the second core network for the UE.

13. The non-transitory computer-readable medium of claim 12, wherein:
the network access policy also includes information describing the first network service and the second network service, and
the processor-executable instructions cause the one or more processors to:
determine whether the first core network or the second core network corresponds to the primary core network by determining whether the first network service or the second network service is more suitable to a primary functionality of the UE.

14. The non-transitory computer-readable medium of claim 10, wherein:
the first network service, of the first core network, includes providing UEs with network connectivity that is consistent with lower network resource usage patterns of typical Machine-to-Machine (M2M) devices,
the second network service, of the second core network, includes providing UEs with broadband network connectivity capable of supporting media sessions between UEs, and
the processor-executable instructions cause the one or more processors to:
under typical operating conditions,
connect to the first core network, and
operate in a manner consistent with that of a M2M device; and
in response to the prompt,
connect to the second core network, and
establish a media session via an Internet Protocol (IP) Multimedia Subsystem (IMS) of the second core network.

15. The non-transitory computer-readable medium of claim 10, wherein, in response to connecting with the first core network, the processor-executable instructions cause the one or more processors to:
establish a media session via an Internet Protocol (IP) Multimedia Subsystem (IMS) of the first core network, or
obtain broadband Internet access via the first core network, and
in response to the prompt, the processor-executable instructions cause the one or more processors to:
connect to the second core network, and
operate in a manner that is consistent with lower network resource usage patterns of Machine-to-Machine (M2M) devices.

16. The non-transitory computer-readable medium of claim 10, wherein the prompt includes a request to make an emergency call via the wireless telecommunication network.

17. A method, implemented by a user equipment (UE), the method comprising:
when initially connecting to a wireless telecommunications network that includes a first core network and a second core network,
connecting to the first core network, the first core network operating as a default core network, of the wireless telecommunications network, for distributing a network access policy;
receiving, from a policy and access system connected to the first core network, the network access policy, the network access policy including:
information identifying the first core network of the wireless telecommunications network;
information identifying the second core network of the wireless telecommunications network;
information identifying an Access Point Name (APN) for accessing a first network service of the first core network;
information identifying an APN for accessing a second network service, which is different from the first network service, of the second core network; and
instructions to switch between the first core network and the second network in order to access the first network service and the second network service depending on a request from a user to access the second network service;
accessing the first network service, of the first core network, using the APN of the first network service
detecting, as a prompt, the request from the user to access the second network service; and
in response to the prompt, use the information and instructions of the network access policy to:

disconnecting, in response to the prompt, from the first core network;
connecting to the second core network; and
accessing the second network service via the second core network.

18. The method of claim 17, wherein:
the first network service, of the first core network, includes providing UEs with network connectivity that is consistent with lower network resource usage patterns of typical Machine-to-Machine (M2M) devices,
the second network service, of the second core network, includes providing UEs with broadband network connectivity capable of supporting media sessions between UEs, and
the method further comprises:
under typical operating conditions,
connecting to the first core network, and
operating in a manner consistent with that of a M2M device; and
in response to the prompt,
connecting to the second core network,
establishing a media session via an Internet Protocol (IP) Multimedia Subsystem (IMS) of the second core network.

19. The method of claim 18, further comprising:
in response to a termination of the media session,
disconnecting from the second core network, and
reconnecting with the first core network, and
operating in the manner consistent with that of the M2M device.

20. The method of claim 17, wherein the prompt includes a request to make an emergency call via the wireless telecommunication network.

* * * * *